US007521100B2

(12) United States Patent
Imaizumi et al.

(10) Patent No.: US 7,521,100 B2
(45) Date of Patent: Apr. 21, 2009

(54) LIQUID CRYSTAL SEALING AGENT AND LIQUID CRYSTALLINE DISPLAY CELL USING THE SAME

(75) Inventors: Masahiro Imaizumi, Kita-ku (JP); Toyofumi Asano, Saitama (JP); Naoyuki Ochi, Saitama (JP); Masahiro Hirano, Ageo (JP); Sumio Ichimura, Kita-ku (JP); Masaru Kudo, Saitama (JP); Katsuhiko Oshimi, Saitama (JP); Masataka Nakanishi, Saitama (JP); Yasumasa Akatsuka, Saitama (JP); Eiichi Nishihara, Kita-ku (JP); Masayuki Itai, Sanyoonoda (JP)

(73) Assignee: Nippon Kayaku Kabushiki Kaisha, Tokyo (JP)

(*) Notice: Subject to any disclaimer, the term of this patent is extended or adjusted under 35 U.S.C. 154(b) by 600 days.

(21) Appl. No.: 10/552,183

(22) PCT Filed: Apr. 6, 2004

(86) PCT No.: PCT/JP2004/004972

§ 371 (c)(1),
(2), (4) Date: Oct. 6, 2005

(87) PCT Pub. No.: WO2004/090621

PCT Pub. Date: Oct. 21, 2004

(65) Prior Publication Data

US 2006/0208219 A1    Sep. 21, 2006

(30) Foreign Application Priority Data

Apr. 8, 2003 (JP) .............................. 2003-103566
Apr. 8, 2003 (JP) .............................. 2003-103590

(51) Int. Cl.
C09K 3/10 (2006.01)
G02F 1/1339 (2006.01)
C08L 63/02 (2006.01)
C08G 59/04 (2006.01)

(52) U.S. Cl. ...................... 428/1.53; 428/1.5; 349/153; 349/190; 522/100; 525/31; 525/150; 525/396; 525/487; 528/87; 528/90; 156/275.3; 156/275.5

(58) Field of Classification Search ................ 428/1.5, 428/1.53, 1.55; 349/153, 190; 525/31, 330.4, 525/150, 396, 487; 524/502; 522/100; 156/275.5, 156/275.3; 528/87, 90

See application file for complete search history.

(56) References Cited

U.S. PATENT DOCUMENTS

| 4,284,574 A | 8/1981 | Bagga ....................... 549/555 |
| 4,845,172 A | 7/1989 | Brytus et al. ................ 525/481 |
| 5,150,239 A | 9/1992 | Watanabe et al. ........... 349/153 |
| 5,596,023 A | 1/1997 | Tsubota et al. .............. 522/100 |
| 6,010,824 A | 1/2000 | Komano et al. .......... 430/281.1 |
| 6,120,858 A | 9/2000 | Hirano et al. .............. 428/1.53 |
| 6,287,745 B1 | 9/2001 | Yamamura et al. .......... 430/269 |
| 2002/0176046 A1* | 11/2002 | Kitamura et al. ............ 349/153 |
| 2003/0147034 A1 | 8/2003 | Kojima ....................... 349/153 |
| 2005/0222300 A1 | 10/2005 | Ikezawa et al. .............. 523/457 |
| 2006/0004140 A1* | 1/2006 | Asano et al. ................... 525/31 |
| 2006/0014873 A1 | 1/2006 | Ikezawa et al. .............. 524/413 |

FOREIGN PATENT DOCUMENTS

| EP | 0 632 080 | 1/1995 |
| EP | 1 061 402 | 12/2000 |
| JP | 61-186376 | 8/1986 |
| JP | 63-179323 | 7/1988 |
| JP | 2-223954 | 9/1990 |
| JP | 5-295087 | 11/1993 |
| JP | 6-073164 | 3/1994 |
| JP | 6-73164 | 3/1994 |
| JP | 07-013135 | 1/1995 |
| JP | 08-033357 | 2/1996 |
| JP | 9-005759 | 1/1997 |

(Continued)

OTHER PUBLICATIONS

The Supplemental European Search Report dated Feb. 15, 2007.
The International Search Report dated Jul. 27, 2004.
Database WPI Week 200144, Derwent Publications Ltd, London, XP-002417512 (2001-414008) May 18, 2001.
European communication dated Feb. 9, 2007.
The International Search Report dated Feb. 24, 2004.
Office Actions in U.S. Appl. No. 10/532,705 dated Aug. 1, 2007, Oct. 26, 2007 and May 7, 2008.

Primary Examiner—Shean C Wu
(74) Attorney, Agent, or Firm—Nields, Lemack & Frame, LLC

(57) ABSTRACT

The present invention relates to a sealant for liquid crystals having extremely low contamination nature to a liquid crystal, excellent coatability and bondability to a substrate, long service life and pot life and high adhesive strength. A sealant for liquid crystals of the present invention is characterized by comprising (a) an epoxy resin represented by general formula (1):

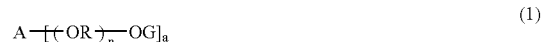

(wherein a represents an integer of 2 to 4; n represents 0 to 3 (average value); R represents a divalent hydrocarbon group of 2 to 6 carbon atoms; A represents a polyvalent aromatic group; and G represents a glycidyl group, provided that when n is 0, (a) an epoxy resin represented by general formula (1) is a bisphenol S-type.), (b) a thermo-curing agent, (c) and a filler having average particle diameter of not larger than 3 μm.

22 Claims, No Drawings

FOREIGN PATENT DOCUMENTS

| | | |
|---|---|---|
| JP | 10-239694 | 9/1998 |
| JP | 11-109388 | 4/1999 |
| JP | 2001-75109 | 3/2001 |
| JP | 2001-133794 | 5/2001 |
| JP | 2001-172475 | 6/2001 |
| JP | 2002-182188 | 6/2002 |
| JP | 2002-256058 | 9/2002 |
| JP | 2002-317172 | 10/2002 |
| JP | 2003-176332 | 6/2003 |
| JP | 2003-321532 | 11/2003 |
| JP | 2004-137425 | 5/2004 |
| JP | 2004-198464 | 7/2004 |

\* cited by examiner

LIQUID CRYSTAL SEALING AGENT AND LIQUID CRYSTALLINE DISPLAY CELL USING THE SAME

TECHNICAL FIELD

The present invention relates to a sealing agent (sealant) for liquid crystals, a liquid crystalline display cell using the sealant and a composition suitable for the sealant for liquid crystals. More specifically, the present invention relates to a sealant for liquid crystals suitable for manufacturing a liquid crystal display cell by a liquid-crystal dropping technique (liquid-crystal One Drop Filling; ODF), a liquid crystal display cell manufactured using the sealant and a composition suitable for the sealant for liquid crystals.

BACKGROUND ART

In recent years, along with demands for large-size liquid crystal display cells, a so-called liquid-crystal dropping technique (liquid-crystal One Drop Filling; ODF), which has higher productivity, has been proposed as a manufacturing method of a liquid-crystal display cell (see Japanese Patent Application Laid-Open Nos. 63-179323 and 10-239694). In these methods, a liquid crystal display cell in which a liquid crystal is sealed is manufactured by dropping the liquid crystal inside a bank of a sealant for liquid crystals formed on one substrate, thereafter bonding the other substrate thereto.

In the liquid-crystal dropping technique, however, the sealant for liquid crystals in uncured state is made in contact with the liquid crystal, with the result that there is a problem that, upon manufacturing a liquid crystal display cell, some components of the sealant for liquid crystals are dissolved in the liquid crystal to cause reduction in the specific resistance of the liquid crystal; consequently, this technique has not spread as a mass-producing method for liquid crystal display cells.

With respect to a curing method after the bonding process of the sealant for liquid crystals in the liquid-crystal dropping technique, three methods including a thermo-curing method, a photo-curing method and a photo-thermo-curing method, have been proposed. The thermo-curing method has problems in that liquid crystal tends to leak from the sealant for liquid crystals that is being cured with reduced viscosity due to expansion of the heated liquid crystal, and in that some components of the sealant for liquid crystals with the reduced viscosity tend to be dissolved in the liquid crystal, and these problems are difficult to be resolved with the result that this technique has not been practically used.

Here, with respect to the sealant for liquid crystals to be used in the photo-curing method, two kinds of photopolymerization initiators, that is, a cation polymerizable type and a radical polymerizable type, have been proposed. With respect to the sealant for liquid crystals of the cation polymerizable type, since ions are generated upon photo-curing, the ion components are eluted in the liquid crystal in a contact state when the sealant of this type is used in the liquid-crystal dropping technique, resulting in a problem of a reduced specific resistance in the liquid crystal. Another problem with both of the photo-curing methods of the cation polymerizable type and the radical polymerizable type is that since a light-shield portion in which the sealant for liquid crystals is not exposed to light is left due to a metal wiring portion of an alley substrate of the liquid crystal display cell and a black matrix portion of a color filter substrate, the corresponding light-shield portion is uncured.

As described above, the thermo-curing and photo-curing methods have various problems, and in actual operation, the photo-thermo curing method is considered to be the most practical technique. The photo-thermo curing method is characterized by that the sealant for liquid crystals sandwiched by substrates is irradiated by light for primary curing, and thereafter heated for secondary curing. With respect to properties required for the sealant for liquid crystals to be used for the photo-thermo curing method, it is important to prevent the sealant for liquid crystals from contaminating the liquid crystal in respective processes before and after the light irradiation as well as before and after the heat-curing processes, and it is necessary to properly address the problem with the above-mentioned light-shield portion, that is, the problem of elution of the sealant components into the liquid crystal when the portion uncured by light irradiation is thermally cured. The following solutions to the problems are proposed: (1) a low-temperature fast curing process is carried out prior to the elution of the sealant components; and (2) the sealant is made from components that hardly elute into the liquid crystal compositions. Of course, the low-temperature fast curing process simultaneously causes degradation in the pot life during use, resulting in a serious problem in practical use. For this reason, in order to achieve a sealant for liquid crystals that provides longer pot life, and hardly contaminates liquid crystals, it is necessary to comprise components that are hardly eluted into the liquid crystal composition. However, commonly well known epoxy resins, such as a bisphenol A type epoxy resin and a bisphenol F type epoxy resin, have a good compatibility with liquid crystals with the result that these resins are not suitable for the constituent component for the sealant from the viewpoint of contamination-preventive property.

Japanese Patent Application Laid-Open No. 2001-133794 has proposed that a partially (meth)acrylated-bisphenol A-type epoxy resin disclosed in Japanese Patent Application Laid-Open No. 5-295087 should be used as a main resin component for the sealant for liquid crystals for use in the liquid-crystal dropping technique. In this case, however, although the (meth)acrylated resin has reduced solubility to liquid crystals, the degree of the reduction is not sufficient, and it is also difficult to solve a problem of the un-reacted remaining raw epoxy resin that contaminates liquid crystals.

As described above, the conventionally proposed photo-thermo curing type sealant for liquid crystals used in the liquid-crystal dropping technique is far from satisfying all the properties such as liquid crystal contamination-preventive property, adhesive strength, workable time at room temperature and low-temperature curing property.

The objective of the present invention is to develop a sealant for liquid crystals to be used for a liquid crystal display device to be manufactured by a liquid-crystal dropping technique, and more specifically, to develop a sealant for liquid crystals to be used for a liquid crystal display device to be manufactured by the liquid-crystal dropping technique comprising dropping a liquid crystal inside a bank of a sealant for liquid crystals formed on one substrate, thereafter bonding the other substrate thereto, irradiating a liquid-crystal sealed portion with light, and then heat-curing it. In other words, the objective of the present invention is to provide a sealant for liquid crystals which hardly contaminates liquid crystals throughout the manufacturing processes, shows excellent coatability, bondability and adhesive strength when applied to a substrate, and has long workable time (pot life) at room temperature and excellent low-temperature curing property.

DISCLOSURE OF THE INVENTION

As the result of extensive investigations a way to solve the above-mentioned problems, the present inventors have found that a sealant for liquid crystals comprising: (a) an epoxy resin represented by general formula (1) (that is, a bisphenol S-type epoxy resin or an epoxy resin having an alkylene oxide unit in the structure); (b) a thermo-curing agent; and (c) a filler having average particle diameter of not larger than 3 μm can attain the above objectives, and thus completed the present invention.

The present invention relates to the following aspects:

1. A sealant for liquid crystals characterized by comprising (a) an epoxy resin represented by general formula (1):

$$A-[(OR)_n-OG]_a \qquad (1)$$

(wherein a represents an integer of 2 to 4; n represents 0 to 3 (average value); R represents a divalent hydrocarbon group of 2 to 6 carbon atoms; A represents a polyvalent aromatic group; and G represents a glycidyl group, provided that when n is 0, (a) an epoxy resin represented by general formula (1) is a bisphenol S-type.), a thermo-curing agent (b), and a filler (c) having average particle diameter of not larger than 3 μm.

2. The sealant for liquid crystals according to the above aspect 1, wherein the polyvalent aromatic group is a di- or trivalent phenol or naphthol residue; a di- to tetravalent aromatic group formed by bonding 2 to 4 benzene rings or naphthalene rings (the benzene ring or naphthalene ring may have an aliphatic group of 1 to 6 carbon atoms as a substituent, and the total bonding arms on the ring is 2 to 4) through single bond, a divalent aliphatic hydrocarbon residue (which may be substituted with a phenyl group) of 1 to 3 carbon atoms, an oxygen atom or a sulfur atom (which may be in a form of a sulfonyl); or a residue obtained by removing a hydroxyl group from a novolac resin.

3. The sealant for liquid crystals according to the above aspect 2, wherein the polyvalent aromatic group is a divalent aromatic group represented by the formula:

-ph-X-ph-

{wherein ph represents a phenylene group (which may have an aliphatic group of 1 to 6 carbon atoms as a substituent); X represents a cross-linking group represented by —O—, —S—, —S(O)$_2$— or the formula:

—C(R$_3$)(R$_4$)—

(wherein R$_3$ and R$_4$ represent each independently a hydrogen atom or a methyl group, or R$_3$ and R$_4$ are bonded to form a fluorene ring of C(R$_3$)(R$_4$))}.

4. The sealant for liquid crystals according to the above aspect 1, wherein (a) epoxy resin represented by general formula (1) is a bisphenol S-type; and n represents 0 to 3 (average value).

5. The sealant for liquid crystals according to the above aspect 4, wherein (a) epoxy resin is an epoxy resin represented by general formula (2):

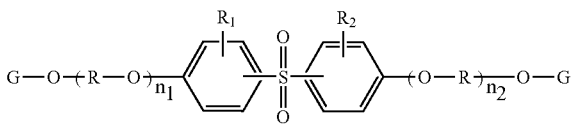

(wherein n$_1$ and n$_2$ represent each independently 0.5 to 3; R represents a divalent hydrocarbon group of 2 to 6 carbon atoms; R$_1$ and R$_2$ represent each independently a hydrogen atom or a monovalent hydrocarbon group of 1 to 6 carbon atoms; and G represents a glycidyl group).

6. The sealant for liquid crystals according to the above aspect 5, wherein (a) epoxy resin is an epoxy resin represented by general formula (3):

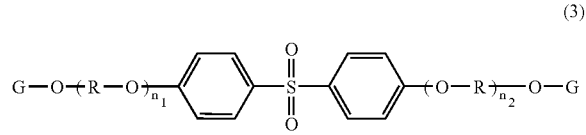

(wherein n$_1$ and n$_2$ represent each independently 0.5 to 3; R represents a divalent hydrocarbon group of 2 to 6 carbon atoms; and G represents a glycidyl group).

7. The sealant for liquid crystals according to the above aspect 1, wherein (a) epoxy resin is an epoxy resin represented by general formula (4):

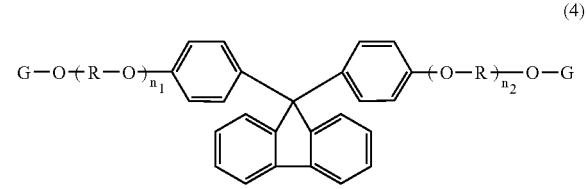

(wherein n$_1$ and n$_2$ represent each independently a positive number of 0.5 to 3; R represents a divalent hydrocarbon group of 2 to 6 carbon atoms; and G represents a glycidyl group).

8. The sealant for liquid crystals according to any one of the above aspects 1 to 7, wherein —O—R— is —O—CH$_2$CH$_2$—.

9. The sealant for liquid crystals according to above aspects 1 and 4, wherein n represents 1 to 1.5.

10. The sealant for liquid crystals according to any one of the above aspects 1 to 7, wherein the thermo-curing agent (b) is polyfunctional dihydrazides or a polyvalent phenol compound.

11. The sealant for liquid crystals according to the above aspect 10, wherein the polyfunctional dihydrazides are isophthalic acid hydrazide, dihydrazides having valine hydantoin skeleton, or adipic acid dihydrazide.

12. The sealant for liquid crystals according to any one of the above aspects 1 to 11, wherein mixing ratio of the epoxy resin (a) and the thermo-curing agent (b) is 0.8 to 3 equivalent of the active hydrogen of the thermo-curing agent (b) based on 1 equivalent of the epoxy group of the epoxy resin (a); and the content of (c) filler having average particle diameter of not larger than 3 μm in the sealant for liquid crystals is from 5 to 40% by weight.

13. The sealant for liquid crystals according to any one of the above aspects 1 to 12, further comprising, as a component, (d) a curable resin having a (meth)acrylic group and (e) a radical-forming type photopolymerization initiator.

14. The sealant for liquid crystals according to the above aspect 13, wherein the curing resin (d) having a (meth)acrylic group is a (meth)acrylate of an aromatic epoxy resin.

15. The sealant for liquid crystals according to the above aspect 14, wherein the (meth)acrylate of an aromatic epoxy resin is a (meth)acrylate of a bisphenol-type epoxy resin.

16. The sealant for liquid crystals according to the above aspect 13, wherein the curing resin (d) having a (meth)acrylic group is a (meth)acrylate of (a) epoxy resin represented by the general formula (1) wherein n is not 0.

17. The sealant for liquid crystals according to any one of the above aspects 13 to 16, wherein the radical-forming photopolymerization initiator (e) is a carbazole-series photopolymerization initiator or an acridine-series photopolymerization initiator.

18. The sealant for liquid crystals according to any one of the above aspects 1 to 17, further comprising (f) a silane coupling agent.

19. The sealant for liquid crystals according to any one of the above aspects 1 to 18, further comprising (g) an ion scavenger.

20. The sealant for liquid crystals according to the above aspect 19, wherein the ion scavenger is at least one kind selected from a group consisting of a bismuth oxide-series ion scavenger, an antimony oxide-series ion scavenger, a titanium phosphate-series ion scavenger, a zirconium phosphate-series ion scavenger and a hydrotalcite-series ion scavenger.

21. The sealant for liquid crystals according to the above aspect 19 or 20, wherein the contents in the sealant for liquid crystals fall in the ranges of 5 to 80% of the epoxy resin (a) component, 2 to 20% of the thermo-curing agent (b) component, 5 to 50% of the filler (c) component having average particle diameter of not larger than 3 μm, 5 to 80% of the curable resin (d) component having a (meth)acrylic group, 0.1 to 3% of the radical-forming photopolymerization initiator (e) component, 0.2 to 2% of the silane coupling agent (f) component and 0.2 to 20% of the ion scavenger (g) component.

22. A liquid crystal display cell sealed by a cured product of the sealant for liquid crystals according to any one of the above aspects 1 to 21.

23. A method for manufacturing a liquid crystal display cell characterized, in the liquid crystal display cell composed of two substrates, by dropping a liquid crystal inside a bank of the sealant for liquid crystals according to any one of the above aspects 1 to 22, that is formed on one substrate, thereafter bonding the other substrate thereto and then curing the sealant for liquid crystals.

24. A composition characterized by comprising (a) an epoxy resin represented by general formula (1):

   (1)

(wherein a represents an integer of 2 to 4; n represents 0 to 3 (average value); R represents a divalent hydrocarbon group of 2 to 6 carbon atoms; A represents a polyvalent aromatic group; and G represents a glycidyl group, provided that when n is 0, (a) the epoxy resin represented by general formula (1) is a bisphenol S-type.), (b) a thermo-curing agent, and (c) a filler having average particle diameter of not larger than 3 μm.

25. The composition according to the above aspect 24, characterized by further comprising (d) a curable resin having a (meth)acryl group, (e) a radical-forming photopolymerization initiator, (f) a silane coupling agent and (g) an ion scavenger.

BEST MODE FOR CARRYING OUT THE INVENTION

A sealant for liquid crystals and a composition of the present invention are characterized by comprising (a) an epoxy resin represented by general formula (1), (b) a thermo-curing agent and (c) a filler having average particle diameter of not larger than 3 μm.

The divalent hydrocarbon group of 2 to 6 carbon atoms represented by R in general formula (1) may be any of saturated, unsaturated, chain, cyclic or a combination thereof, and usually an alkylene group of 2 to 6 carbon atoms is preferable.

The polyaromatic group represented by A in general formula (1) is not particularly limited, as long as it is an aromatic residue obtained by removing a hydroxyl group from an aromatic polyvalent alcohol having not less than two phenolic hydroxyl groups. For example, it includes a di- or trivalent phenol or naphthol residue; a di- to tetravalent aromatic group formed by bonding 2 to 4 benzene rings or naphthalene rings (aliphatic group(s) of 1 to 6 carbon atoms may be present as a substituent on the benzene ring or naphthalene ring, and the total number of bonding arms on the ring is 2 to 4) through single bond, divalent aliphatic hydrocarbon residue(s) (which may be substituted with a phenyl group) of 1 to 3 carbon atoms, oxygen atom(s) or a sulfur atom(s) (which may be in a sulfonyl form); or a residue obtained by removing a hydroxyl group from a novolac resin. More preferably, the polyvalent aromatic group includes a divalent aromatic group represented by the formula:

-ph-X-ph-

{wherein ph represents a phenylene group (which may have an aliphatic group of 1 to 6 carbon atoms as a substituent); X represents —O—, —S—, —S(O)$_2$— or a cross-linking group represented by the formula:

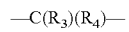

(wherein R$_3$ and R$_4$ represent each independently a hydrogen atom or a methyl group, or R$_3$ and R$_4$ are bonded to form a fluorene ring with C(R$_3$)(R$_4$)).

An epoxy resin (a) to be used for the present invention is obtained, when n in general formula (1) is 0 (that is, when the epoxy resin (a) is a bisphenol S-type epoxy resin), by subjecting a raw material bisphenol Ss such as bisphenol S and bis-C1-C6 hydrocarbon group-substituted phenol S (bisphenol S having a hydrocarbon substituent of 1 to 6 carbon atoms on the benzene ring); bis(hydroxyl-alkoxyphenyl)sulfones obtained by reacting the bisphenol Ss with an alkylene oxide, and the like; or a novolac containing bisphenol Ss in the backbone molecule such as bisphenol S novolac, to react with an epihalohydrin. On the other hand, an epoxy resin (a) is obtained, when n is not 0, by subjecting a raw material aromatic polyvalent alcohol, preferably an aromatic polyvalent alcohol corresponding to the above mentioned group as an example of A, more preferably a phenol compound (a polyvalent phenol or an aromatic polyvalent alcohol obtained by bonding mono- or polyvalent phenols through a cross-linking group), to addition reaction with an alkylene oxide and then reacting a hydroxyl group of thus obtained compound with epihalohydrin.

The aromatic polyvalent alcohol to be used as a raw material is not particularly limited as long as it is an aromatic polyvalent alcohol and preferably includes a polyvalent phenol compound, for example, bisphenols such as bisphenol A, bisphenol F, bisphenol E, bisphenol S, bisphenolfluorene, biscresolfluorene, oxydicresol and thiodiphenol; novolacs such as phenol novolac, cresol novolac, bisphenol A novalac, bisphenol F novalac and phenol novolac having triphenolmethane skelton; polyhydric phenols having two to three hydroxyl groups such as catechol, resorcin, hydroquinone and pyrogallol; and biphenols, preferably bisphenol type (including biphenols) dihydric alcohols such as bisphenol A, bisphenol F, bisphenol E, bisphenol S, bisphenolfluorene, oxydiphenol, thiodiphenol and biphenol, and more preferably bisphenol S and bisphenolfluorene. Epihalohydrins are not limited especially, however, include epichlorohydrin, β-methyl epichlorohydrin, epibromohydrin and β-methylepibromohydrin, and epichlorohydrin is preferable.

Alkylene oxides which can be added to a phenol are not limited especially, as long as they are compounds corresponding to R of the general formula (I), including usual alkylene oxides compounds having two to six carbon atoms, such as ethylene oxide, propylene oxide, tetramethylene oxide, methylethylene oxide and hexamethylene oxide, and ethylene oxide is preferable from the standpoints of heat resistance and mechanical strength. Similarly, the amount of an alkylene oxide to be added is preferably 0.5 to 3 equivalent, more preferably 1.0 to 1.5 equivalent of the alkylene oxidebased on 1 equivalent of a phenol.

A sealant for liquid crystals of the present invention contains the thermo-curing agent (b). The thermo-curing agent is not particularly limited as long as it reacts with an epoxy resin by heating, usually heating to not lower than 50° C. to form a cured product. It is usually important that the reaction is initiated uniformly and quickly without contamination to a liquid crystal upon heating and that time lapse-change in viscosity is less at room temperature during use. A thermo-curing agent that meets such conditions is preferable. With respect to curing condition in a liquid-crystal dropping technique, it is required for a thermo-curing agent to have low temperature curing ability under curing conditions of generally not higher than 120° C. in about one hour so as to keep degradation of characteristics of a sealed liquid crystal at the minimum. Considering the above conditions, use of polyfunctional dihydrazides and polyvalent phenols is especially preferable as a thermo-curing component of a sealant for liquid crystals of the present invention.

The polyfunctional dihydrazides mean compounds having not less than 2 hydrazide groups in the molecule and any of these compounds can be used. Generally, the polyfunctional dihydrazides include an acid hydrazide having not less than 2, usually 2 to 4 acid hydrazide groups on the skeleton of an aliphatic or aromatic hydrocarbon of 2 to 20 carbon atoms. The above acid hydrazide group may be bonded to the hydantoin skeleton formed on the above hydrocarbon skeleton through an alkylene of 1 to 3 carbon atoms. In the case of the skeleton of an aromatic hydrocarbon, 1 or 2 nitrogen atoms may be contained in the skeleton.

Typical examples of polyfunctional dihydrazides include, for example, dibasic acid dihydrazides having aliphatic acid skeltone, such as oxalic acid dihydrazide, malonic acid dihydrazide, succinic acid dihydrazide, adipic acid dihydrazide, adipic acid dihydrazide, pimelic acid dihydrazide, suberic acid dihydrazide, azelaic acid dihydrazide, sebacic acid dihydrazide, dodecanedioic acid dihydrazide, hexadecanedioic acid dihydrazide, maleic acid dihydrazide, fumaric acid dihydrazide, diglycolic acid dihydrazide, tartaric acid dihydrazide and malic acid dihydrazide; aromatic dihydrazides such as isophthalic acid dihydrazide, terephthalic acid dihydrazide, 2,6-naphthoic acid dihydrazide, 1,4-benzene dihydrazide, 1,4-naphthoic acid dihydrazide, 2,6-pyridine dihydrazide, 1,2,4-benzene trihydrazide, pyromellitic acid tetrahydrazide, 1,4,5,8-naphthoic acid tetrahydrazide; dihydrazides having valine hydantoin skeltone such as 1,3-bis(hydrazinecarbonoethyl)-5-isopropylhydantoin, but are not limited thereto.

When polyfunctional hydrazides are used as a curing agent, they are preferably pulverized to fine particles and dispersed uniformly. Among the polyfunctional hydrazides, isophthalic dihydrazide and dihydrazides having valine hydantoin skeleton are particularly preferable. Too large average particle diameter of the above polyfunctional hydrazides causes a problem of defective gap formation upon bonding of upper and lower glass substrates each other when a liquid crystal cell with a narrow gap is manufactured, therefore, the average particle diameter is preferably not larger than 3 μm, more preferably not larger than 2 μm. Moreover, for the same reason, the maximum particle diameter is preferably not larger than 8 μm, more preferably not larger than 5 μm. Here, particle diameter of a curing agent was measured using a laser diffraction-scattering type measuring device of particle diameter distribution (dry type) (LMS-30, manufactured by Seishin Enterprise Co., Ltd.).

When the polyvalent phenol compound is used as a curing agent it is preferably used in a homogeneous system. Examples of preferable polyhydric phenols include polyfunctional novolacs such as phenol-formaldehyde polycondensates, cresol-formaldehyde polycondensates, hydroxybenzaldehyde-phenol polycondensates, cresol-naphthol-formaldehyde polycondensates, resorcin-formalin polycondensates and furfural-phenol polycondensates, a-hydroxyphenyl-ω-hydropoly(biphenyldimethylene-hyroxyphenylene); bisphenol A, bisphenol F, bisphenol S, thiodiphenol, 4,4'-biphenylphenol and dihydroxynaphthalene, but are not limited thereto.

Mixing ratio of the thermo-curing agent (b) is preferably 0.8 to 3.0 equivalent, more preferably 0.9 to 2.0 equivalent of active hydrogenbased on the epoxy resin (a) in a sealant for liquid crystals of the present invention. The sealant having such amount of the thermo-curing agent (b) is preferable because of having high adhesive strength, high glass transition temperature and sufficient pot life.

The filler (c) to be used in the present invention is not particularly limited as long as it functions as a filler and includes, for example, fused silica, crystalline silica, silicon carbide, silicon nitride, boron nitride, calcium carbonate, magnesium carbonate, barium sulfate, calcium sulfate, mica, talc, clay, alumina, magnesium oxide, zirconium oxide, aluminum hydroxide, magnesium hydroxide, calcium silicate, aluminum silicate, lithium aluminum silicate, zirconium silicate, barium titanate, glass fiber, carbon fiber, molybdenum disulfide, asbestos, preferably, fused silica, crystalline silica, silicon nitride, boron nitride, calcium carbonate, barium sulfate, calcium sulfate, mica, talc, clay, alumina, aluminum hydroxide, calcium silicate and aluminum silicate, and fused silica, crystalline silica, alumina and talc are more preferable. The above fillers may be used as a mixture of 2 kinds or more. Considering easy formation of a suitable gap upon bonding upper and lower glass substrates each other in manufacturing a liquid crystal cell, average particle diameter of these fillers is preferably not larger than 3 μm.

Considering easiness of gap formation of a liquid crystal cell, adhesive strength to a glass substrate, moisture-resistant reliability and keeping adhesive strength after moisture absorption, the content of the filler (c) to be used in the present invention in a sealant for liquid crystals is usually 5 to 40% by weight, preferably 15 to 25% by weight.

A sealant for liquid crystals of the present invention can contain, as an additional component, a photo-curable resin, a radical-forming photopolymerization initiator, an ion scavenger, an organic solvent and other additives, which will be described below. Therefore, one of preferable compositions of a sealant of the present invention is 5% to 85%, preferably 10% to 50% of the epoxy resin (a) represented by general formula (1)based on the whole sealant, 0.8 to 3.0, preferably 0.9 to 2.0 equivalent of active hydrogen of the thermo-curing agent (b) based on the epoxy resin (a), 5 to 40% by weight, preferably 15 to 25% by weight of the filler (c) based on the whole sealant, and the balance is other components, which is about 0 to 88%.

To apply a sealant for liquid crystals of the present invention to a liquid-crystal dropping technique, a photo-thermo curing system is preferable. The photo-thermo curing system is characterized by that the sealant for liquid crystals sandwiched by substrates is irradiated by light for primary curing, and subsequent heated for secondary curing. Intending to realize a photo-thermo curing system, the sealant for liquid crystals of the present invention may contain (d) a curable resin having (meth)acrylic group(s) and (e) a radical-forming photopolymerization initiator (here, (meth)acrylic means acrylic and/or methacrylic, and the same hereinafter).

The curable resin (d) having a (meth)acrylic group is not particularly limited, and is preferably a (meth)acrylated resin of an epoxy resin having not less than 2 functions. Epoxy resins with not less than two functional groups include, for example, a bisphenol A type epoxy resin, a bisphenol F type epoxy resin, a bisphenol S type epoxy resin, a thiodiphenol type epoxy resin, a phenol-novolac type epoxy resin, a cresol-novolac type epoxy resin, a bisphenol A-novolac type epoxy resin, a bisphenol F-novolac type epoxy resin, an alicyclic type epoxy resin, an alkyl chain type epoxy resin, a glycidyl ester type epoxy resin, a glycidyl amine type epoxy resin, a hydantoin type epoxy resin, an isocyanurate type epoxy resin, a phenol-novolac type epoxy resin having triphenolmethane skelton, and further diglycidyletherfied compounds of two functional phenols, diglycidyletherfied compounds of two functional alcohols and halogenides or hydrogenated compounds thereof. Among these, a compound having low solubility to liquid crystals, specifically a (meth)acrylate of an aromatic epoxy resin having not less than 2 functions is preferable. The aromatic epoxy is an epoxy resin obtained by reacting an aromatic compound having a reactive hydroxyl group and an epihalohydrin, wherein the aromatic compound having a reactive hydroxyl group is not particularly limited, and includes the aromatic polyvalent alcohol described in the above item on the epoxy resins (a), for example, bisphenols such as bisphenol A, bisphenol F, bisphenol E, bisphenol S, bisphenolfluorene, biscresolfluorene, oxydidiphenol and thiodiphenol; novolacs such as phenol novolac, cresol novolac, bisphenol A novalac, bisphenol F novalac and phenol novolac having triphenolmethane skelton; polyhydric phenols such as catechol, resorcin, hydroquinone and pyrogallol, biphenol and the like. A (meth)acrylate of an aromatic epoxy resin having 2 functions specifically, a (meth)acrylate of a bisphenol-type epoxy resin and a (meth)acrylate of resorcin are more preferable. A (meth)acrylate of (a) an epoxy resin having an alkylene oxide unit is also preferable. The bisphenol-type epoxy resin is preferably an epoxy resin obtained by subjecting a bisphenol-type divalent alcohol (including bisphenol) explained at the item of the above epoxy resin (a) or a divalent alcohol having an aromatic group obtained by reacting the above bisphenol-type divalent alcohol with an alkylene oxide, and the like, to reaction with epichlorohydrin. Specifically, an epoxy resin represented by the following formula (5):

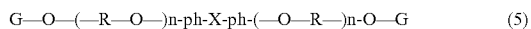

G—O—(—R—O—)n-ph-X-ph-(—O—R—)n-O—G    (5)

(wherein G, R, n, ph and X have each the same meaning as described above) is preferable.

Combined use of a conventionally known epoxy resin other than the above described resins is not also limited in the present invention. For example, a bisphenol F type epoxy resin, an alicyclic epoxy resin, triglycidyl isocyanate, a heterocycle-containing epoxy resin, and a hydrogenated bisphenol A type epoxy resin are included and these epoxy resins may be used together as long as they do not impair characteristics of the present invention. The amount of the above epoxy resin (a) falls in the range of usually 50 to 100% by weight (the same hereinafter), preferably 80 to 100%, more preferably 90 to 100% based on the total amount of epoxy resins in a sealant.

A sealant for liquid crystals of the present invention including a photo-thermo curing agent is preferably such one as contains hydrolyzable chlorine derived from epoxy resins of not higher than 600 ppm, preferably not higher than 300 ppm. The preferable lower limit is as low as possible, for example, not higher than 100 ppm, but usually not higher than about 300 ppm is low enough from the standpoints of technical problems or cost. Such a level of the hydrolyzable chlorine content provides little risk of liquid crystal contamination with chlorine derived from a sealant. The amount of hydrolyzable chlorine can be quantitatively determined, for example, as follows: About 0.5 g of the epoxy resin is first dissolved in 20 ml of dioxane, and after this mixture is refluxed for 30 minutes using 5 ml of 1-N KOH/ethanol solution, the resulting solution is titrated with a 0.01-N silver nitrate solution. The hydrolyzable chlorine derived from epoxy resins comprises above chlorine derived from the epoxy resin (a) and chlorine derived from an epoxy resin used in producing the (meth) acrylate and chlorine derived from other epoxy resins, if used together. The amount of hydrolyzable chlorine here derived from epoxy resins means the total amount of these chlorines.

An epoxy (meth)acrylate used in the present invention is obtained by esterification of the above epoxy resin with (meth)acrylic acid in the presence of a catalyst and a polymerization inhibitor. In the reaction, one kind or not less than 2 kinds of solvents may be added as diluents, including aromatic hydrocarbons such as toluene and xylene; esters such as ethyl acetate and butyl acetate; ethers such as 1,4-dioxane and tetrahydrofuran; ketones such as methylethyl ketone and methylisobutyl ketone; glycol derivatives such as butylcellosolve acetate, carbitol acetate, diethyleneglycol dimethylether and propyleneglycol monomethylether acetate; alicyclic hydrocarbons such as cyclohexanone and cyclohexanol; petroleum solvents such as petroleum ether and petroleum naphtha. These dilution solvents, if used, are required to be removed by evaporation under reduced pressure after completion of the reaction, therefore, a solvent having low boiling point and high volatility is preferable, specifically use of such as toluene, methyl ethyl ketone, methyl isobutyl ketone and carbitol acetate is preferable. Use of a catalyst is preferable to promote reaction. The catalyst to be used includes, for example, benzyldimethylamine, triethylamine, benzyltrimethylammonium chloride, triphenylphosphine and triphenylstibine. The use amount thereof is preferably from 0.1 to 10% by weight, particularly preferably from 0.3 to 5% by weight based on the mixture of the reaction raw materials. To prevent polymerization of (meth)acrylic groups themselves during the reaction, use of a polymerization inhibitor is preferable. Polymerization inhibitors include, for example, methoquinone, hydroquinone, methylhydroquinone, phenothiazine and dibutylhydroxytoluene. The use amount thereof is preferably from 0.01 to 1% by weight, particularly preferably from 0.05 to 0.5% by weight based on the mixture of the reaction raw materials. The reaction temperature is usually from 60 to 150° C., particularly preferably from 80 to 120° C. The reaction time is preferably from 5 to 60 hours.

To control reactivity and viscosity, a monomer and/or an oligomer of a (meth)acrylic ester may be used together as a curable resin having a (meth)acrylic group. Such a monomer and an oligomer include, for example, reaction products of dipentaerythritol with (metha)acrylic acid and reaction products of dipentaerythritol caprolactone with (metha)acrylic acid, but are not particularly limited as long as they have low contamination to a liquid crystal.

The radical-forming photopolymerization initiator (e) to be used for a sealant for liquid crystals of the present invention preferably has sensitivity at the vicinity of i-ray (365 nm) that gives comparatively small effects on characteristics of liquid crystals, and is an initiator of low contamination to liquid crystals. The radical-forming photopolymerization initiators which may be used include, for example, benzyldimethyl ketal, 1-hydroxycyclohexylphenyl ketone, diethylthioxanthone, benzophenone, 2-ethylanthraquinone, 2-hydroxy-2-methylpropiophenone, 2-methyl-[4-(methylthio)-phenyl]2-morpholino-1-propane, 2,4,6-trimethylbenzoyldiphenylphosphine oxide, 3,6-bis(2-methyl-2-morpholinopropionyl)-9-n-octylcarbazole and 1,7-bis(9-acrydyl)heptane and preferable ones include carbazole type photopolymerization initiators such as 3,6-bis(2-methyl-2-morpholinopropionyl)-9-n-octylcarbazole and acridine type photopolymerization initiators such as 1,7-bis(9-acrydyl) heptane.

Mixing ratio of the radical-forming photopolymerization initiator (e) to the curable resin (d) having a (meth)acrylic group in a sealant for liquid crystals of the present invention is usually from 0.1 to 10 parts by weight, preferably from 0.5 to 3 parts by weight based on 100 parts by weight of the component (d). The radical-forming photopolymerization initiator of less than 0.1 parts by weight gives insufficient photo-curing reaction, while the concentration over 10 parts by weight, such problems tend to arise as contamination to liquid crystals by the initiator and degradation of cured-resin characteristics.

A sealant for liquid crystals of the present invention preferably contains a silane coupling agent (f) to improve adhesive strength thereof. Coupling agents which may be used include, for example, silane coupling agents such as 3-glycidoxypropyltrimethoxysilane, 3-glycidoxypropylmethyldimethoxysilane, 3-glycidoxypropylmethyldimethoxysilane, 2-(3,4-epoxycyclohexyl) ethyltrimethoxysilane, N-phenyl-γ-aminopropyltrimethoxysilane, N-(2-aminoethyl)-3-aminopropyltrimethoxysilane, N-(2-aminoethyl)-3-aminopropylmethyl-dimethoxysilane, 3-aminopropyltriethoxysilane, 3-mercaptopropyltrimethoxysilane, vinyltrimethoxysilane, N-(2-(vinylbenzylamino) ethyl)-3-aminopropyltrimethoxysilane hydrochloride, 3-methacryloyloxypropyltrimehoxysilane, 3-chloropropylmethyldimethoxysilane and 3-chloropropyltrimethoxysilane. Two kinds or more of these silane coupling agents may be mixed, and used. Among these, to obtain superior adhesive strength, a silane coupling agent containing an amino group is preferably used. Using a silane coupling agent, a sealant for liquid crystals having improved adhesive strength and superior moisture-resistant reliability is obtained.

A sealant for liquid crystals of the present invention may further contain an ion scavenger (g) if needed. The ion scavenger added adsorbs and fixes inorganic impurity ions in the sealant for liquid crystals and thus reduces elution of inorganic ions to liquid crystals, resulting in effect of preventing specific resistance of the liquid crystals from lowering. The ion scavenger is preferably an inorganic compound with ion capturing capability. Ion-capturing capability here is ability to reduce ionic impurities by capturing phosphate anions, phosphate anions, organic carboxylate anions, halogen anions, alkaline metal cations, alkaline earth metal cations, etc. The ion scavenger which can be used includes, for example, a bismuth oxide-series ion scavenger represented by the general formula: $BiO_X(OH)_Y(NO_3)_Z$ (wherein X represents a positive number from 0.9 to 1.1; Y represents a positive number from 0.6 to 0.8; and Z represents a positive number from 0.2 to 0.4), an antimony oxide-series ion scavenger, a titanium phosphate-series ion scavenger, a zirconium phosphate-series ion scavenger and a hydrotalcite-series ion scavenger represented by the general formula: $Mg_XAl_Y(OH)_{2X+3Y-2Z}(CO_3)_Z \cdot mH_2O$ (wherein, X, Y and Z represent positive numbers satisfying $2X+3Y-2Z \geqq 0$; and m represents a positive number). These ion scavengers are available on the market by the trade names such as IXE-100 (zirconium phosphate-series ion scavenger, manufactured by Toa Gosei Co., Ltd.), IXE-300 (antimony oxide-series ion scavenger, manufactured by Toa Gosei Co., Ltd.), IXE-400 (titanium phosphate-series ion scavenger, manufactured by Toa Gosei Co., Ltd.), IXE-500 (bismuth oxide-series ion scavenger, manufactured by Toa Gosei Co., Ltd.), IXE-600 (antimony oxide•bismuth oxide-series ion scavenger, manufactured by Toa Gosei Co., Ltd.), DHT-4A (hydrotalcite-series ion scavenger, manufactured by Kyowa Chemical Industry Co., Ltd.) and Kyoward KW-2000 (hydrotalcite-series ion scavenger, manufactured by Kyowa Chemical Industry Co., Ltd.). These ion scavengers may be used alone or as a mixture of 2 or more kinds thereof. Usually, the ion scavenger is preferably used in ratio of from 0.2 to 20% by weight in a sealant composition for liquid crystals.

A sealant for liquid crystals of the present invention can further be added, as needed, with such additives as an organic solvent, an organic filler, a stress relaxation material, a pigment, a leveling agent and an antifoaming agent.

Ratio of each component of a sealant for liquid crystals of the present invention is not particularly limited, however, the content of each component based on the total amount of the sealant (composition) is preferably from 5 to 80% of the epoxy resin (a) where n in general formula (1) is not 0 (which has an alkylene oxide unit in the structure), from 2 to 20% of the thermo-curing agent (b), from 5 to 50% of the filler (c) having average particle diameter of not larger than 3 μm, from 5 to 80% of the curable resin (d) having a (meth)acrylic group, from 0.1 to 3% of the radical-forming photopolymerization initiator (e), from 0.2 to 20% of the silane coupling agent (f) and from 0.2 to 2% of the ion scavenger (g). A sealant for liquid crystals of the present invention can be produced by dissolving and mixing, for example, the components (a), (d) and (e) at the above ratio, then adding into thus obtained mixture predetermined amounts of the components (b), (c), (f) and (g), and mixing uniformly using a known mixer such as a three-roll mill, a sand mill and a ball mill. To remove impurities after mixing, the mixture may be subjected to filtration treatment, as needed.

A liquid crystal cell of the present invention has the following structure: a pair of substrates, each having predetermined electrodes formed thereon, are placed in opposing positions each other at a predetermined gap, and the peripheral portion thereof is sealed with a sealant for liquid crystals of the present invention, with a liquid crystal being enclosed in the gap. The kind of the liquid crystal to be enclosed is not particularly limited. Here, the substrates are composed of a combination of substrate made of such as glass, quartz, plastic or silicone wherein at least one has light transmitting property. The manufacturing process is, for example, as follows: After spacers (gap-controlling materials) such as glass fibers have been added to the sealant for liquid crystals of the present invention, the sealant for liquid crystals is applied onto one of the pair substrates in bank form using such as a dispenser, and liquid crystal is then dropped inside the bank of the sealant for liquid crystals, and the other glass substrate is superposed thereon under vacuum to adjust the gap. After the gap formation, ultraviolet rays are irradiated to the liquid-crystal sealed portion using an ultraviolet-ray irradiation device so that the corresponding portion is photo-cured. The dose of ultraviolet-ray irradiation is usually from 500 to 6000 mJ/cm², preferably, from 1000 to 4000 mJ/cm². Thereafter, the cell is cured at temperature of 90 to 130° C. for one to two hours to obtain a liquid crystal display cell of the present invention. With respect to the spacers, for example, glass fiber, silica beads, polymer beads and the like are used. Diameter of the spacers is different depending on the purposes, but usually from 2 to 8 μm, preferably from 4 to 7 μm. The approximate use amount thereof is usually from 0.1 to 4 parts by weight, preferably, from 0.5 to 2 parts by weight, more preferably, from 0.9 to 1.5 parts by weight, based on 100 parts by weight of the sealant for liquid crystals of the present invention.

A sealant for liquid crystals of the present invention shows significantly low contamination to liquid crystals throughout the manufacturing processes, excellent coating workability and bonding property to a substrate, and high adhesive strength, long workable time (pot life) at room temperature and low-temperature curing property. A liquid crystal cell of the present invention, thus obtained, is free from display defect caused by liquid crystal contamination, and exhibits high adhesive property and superior moisture-resistant reliability.

EXAMPLES

The present invention will be explained in further detail by means of the following Examples, however, the present invention should not be limited thereto.

Synthesis Example 1

Synthesis of an 4,4'-Substituted EO-Added Bis-S-Epoxy Resin (Epoxy Resin A)

Into a flask equipped with a thermometer, a dropping funnel, a condenser and a stirrer, 169 parts of 4,4'-bis(2-hydroxyethyloxy)diphenyl sulfone (trade name: SEO-2; manufactured by Nicca Chemical CO., Ltd., melting point: 183° C., purity: 99.5%), 370 parts of epichlorohydrin, 185 parts of dimethyl sulfoxide and 5 parts of tetramethylammonium chloride were added and dissolved while being stirred, and this mixed solution was heated to 50° C. Next, 60 parts of sodium hydroxide flakes was added thereto in small portions in 100 minutes, and this solution was further subjected to a post reaction at 50° C. for three hours. Upon completion of the reaction, the reaction product was washed with 400 parts of water. Excess epichlorohydrin, and the like were evaporated off from the oil layer at 130° C. under reduced pressure using a rotary evaporator. Methyl isobutyl ketone of 450 parts by weight was added to the residue so as to be dissolved, and this solution was heated to 70° C. A 30% sodium hydroxide aqueous solution of 10 parts by weight was added thereto while the mixture was being stirred, and this was allowed to react for one hour. After the reaction product was washed with water three times, the methyl isobutyl ketone was evaporated off at 180° C. under reduced pressure using a rotary evaporator to obtain 212 parts of a liquid-state epoxy resin A represented by the following formula (6). The resulting epoxy resin had epoxy equivalent of 238 g/eq, with viscosity at 25° C. being 113400 mPa·s.

(6)

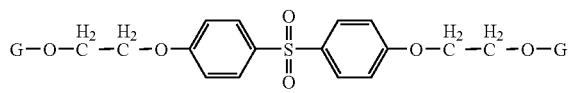

(wherein G represents a glycidyl group)

Synthesis Example 2

Synthesis of an Ethylene Oxide-Added Bisphenol Fluorene Epoxy Resin (Epoxy Resin B)

In a flask equipped with a thermometer, a dropping funnel, a condenser and a stirrer, 220 parts of bisphenoxy ethanol fuluorene (trade name: BPEF; manufactured by Osaka Gas Co., Ltd., white solid, melting point: from 124 to 126° C.) was dissolved in 370 parts of epichlorohydrin while being purged with nitrogen gas, and added with 5 parts of tetramethyl ammonium chloride. After this mixed solution was heated to 45° C., 60 parts of sodium hydroxide flakes was added thereto in small portions in 100 minutes, and this was then subjected to a reaction at 45° C. for three hours. Upon completion of the reaction, the reaction product was washed with water twice to remove formed salts and the like and then heated up to 130° C. to evaporate of f excess epichlorohydrin and the like under reduced pressure using a rotary evaporator. Methyl isobutyl ketone of 552 parts by weight was added to the residue so as to be dissolved. This solution of methyl ethyl ketone was heated to 70° C., added with a 30% by weight sodium hydroxide aqueous solution of 10 parts by weight and allowed to react for one hour. After the reaction, the reaction product was repeatedly washed with water until pH of the washing solution became neutral. After the water layer was separated, the methyl ethyl ketone was evaporated off by heating under reduced pressure using a rotary evaporator to obtain the epoxy resin B represented by the following formula (7). The resulting epoxy resin was semisolid and had epoxy equivalent of 294 g/eq.

(7)

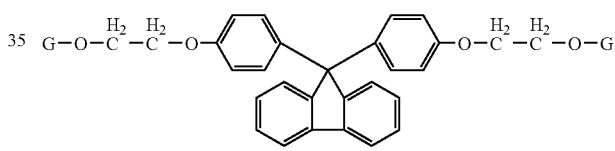

(wherein G represents a glycidyl group)

Synthesis Example a

Synthesis of a 2,4'-Substituted EO Added Bis-S-Epoxy Resin (Epoxy Resin E)

Into a flask equipped with a thermometer, a dropping funnel, a condenser and a stirrer, 169 parts of 2,4'-bis(2-hydroxyethyloxy)diphenyl sulfone (hydroxyl group equivalent: 209, manufactured by Nicca Chemical Co., Ltd.), 370 parts of epichlorohydrin and 185 parts of dimethyl sulfoxide were added and dissolved while being stirred, and this mixed solution was heated to 50° C. Then, 60 parts of sodium hydroxide flakes was added thereto in small portions in 100 minutes, and this solution was further subjected to a post reaction at 50° C. for three hours. Upon completion of the reaction, the reaction product was washed with 400 parts of water. Excess epichlorohydrin, and the like were evaporated off from the oil layer at 130° C. under reduced pressure using a rotary evaporator. Methyl isobutyl ketone of 450 parts by weight was added to the residue so as to be dissolved, and this solution was heated to 70° C. A 30% sodium hydroxide aqueous solution of 10 parts by weight was added thereto while the mixture was being stirred, and this solution was allowed to react for one hour. After the reaction product was washed with water three times, the methyl isobutyl ketone was evaporated off at 180°

C. under reduced pressure using a rotary evaporator to obtain 220 parts of liquid-state epoxy resin A represented by the following formula (8). The resulting epoxy resin had epoxy equivalent of 232 g/eq.

Synthesis Example a

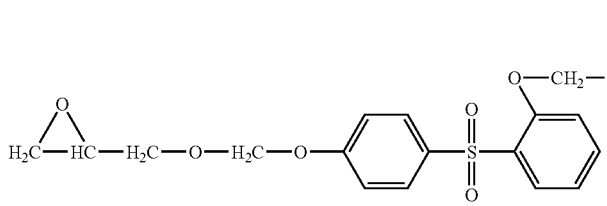

(8)

Synthesis Example B

Synthesis of an Allyl Group-Substituted EO-Added Bis-S-Epoxy Resin (Epoxy Resin F)

Into a flask equipped with a thermometer, a dropping funnel, a condenser and a stirrer, 125.4 parts of a compound (hydroxyl group equivalent: 209) represented by the following formula (9), 222 parts of epichlorohydrin and 111 parts of dimethyl sulfoxide were added and dissolved while being stirred, and this mixed solution was heated to 50° C. Then, 36.4 parts of sodium hydroxide flakes was added thereto in small portions in 100 minutes, and this solution was further subjected to a post reaction at 50° C. for three hours. Upon completion of the reaction, the reaction product was washed with 400 parts of water. Excess epichlorohydrin, and the like were evaporated off from the oil layer at 130° C. under reduced pressure using a rotary evaporator. Methyl isobutyl ketone of 318 parts by weight was added to the residue so as to be dissolved, and this solution was heated to 70° C. A 30% sodium hydroxide aqueous solution of 6 parts by weight was added thereto while the mixture was being stirred, and this solution was allowed to react for one hour. After the reaction product was washed with water three times, the methyl isobutyl ketone was evaporated off at 180° C. under reduced pressure using a rotary evaporator to obtain 153 parts of liquid-state epoxy resin E represented by the following formula (10). The resulting epoxy resin had epoxy equivalent of 265 g/eq.

A raw material in Synthesis Example β

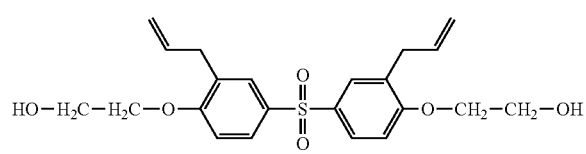

(9)

Synthesis Example B

Experiment Example 1

An Elution Test to Liquid Crystal

Components constituting a sealant that eluted to a liquid crystal, when an epoxy resin composed of high-boiling point components was in contact with the liquid crystal, were determined. In more detail, 0.1 g of an epoxy resin composed of high-boiling point components was added in a sample bottle, added with 1 ml of a liquid crystal (MLC-6866-100, manufactured by Merck Ltd.) and then subjected to contact treatment at 120° C. for one hour in an oven assuming curing conditions of the sealant. After left for standing at room temperature for one hour, the liquid crystal subjected to the contact treatment was moved into an empty bottle. The elution amount (% by weight) relative to the liquid crystal of epoxy resin eluted to the liquid crystal was determined by gas chromatography using pentadecane as an internal standard substance. The results are shown in Table 1.

TABLE 1

|  | Elution amount (% by weight) |
| --- | --- |
| Epoxy resin A | 0.05 |
| Epoxy resin B | 0.47 |
| Epoxy resin C | 9.17 |
| Epoxy resin D | 0.58 |
| Epoxy resin E | 0.80 |

Epoxy resin A: Synthesis Example 1
Epoxy resin B: Synthesis Example 2
Epoxy resin C: RE-310P (epoxy equivalent: 170 g/eq, a liquid-state bisphenol A-type epoxy resin, manufactured by Nippon Kayaku Co., Ltd.)
Epoxy resin D: EBPS-300 (epoxy equivalent: 233 g/eq, a bisphenol S-type epoxy resin, manufactured by Nippon Kayaku Co., Ltd.)
Epoxy resin E: Synthesis Example a As apparent from Table 1, the elution amount to a liquid crystal of a bisphenol A-type epoxy resin (Epoxy resin C) that has conventionally been used for a sealant for liquid crystals is extremely high, while that of an epoxy resin (Epoxy resin B) having ethylene oxide-added structure is very low. It is further apparent that the elution amount of a bisphenol S-type

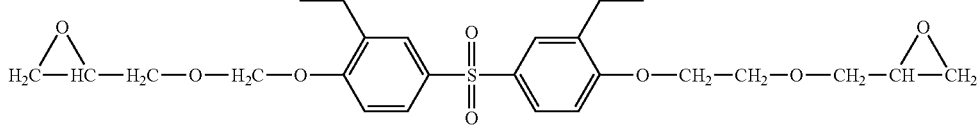

(10)

epoxy resin (Epoxy resin D) itself is small, while the elution amount to a liquid crystal of the Epoxy resin A having ethylene oxide-added structure is one-tenth of or lower than the said amount.

Example 1

A bisphenol F-type epoxy resin (RE-404P, manufactured by Nippon Kayaku Co., Ltd., epoxy equivalent: 160 g/eq, hydrolyzed amount: 30 ppm) was reacted with acrylic acid of amount of 100% equivalent to epoxy groups, subjected to purification by liquid-separation treatment using ion exchanged water/toluene and then deprived of toluene by evaporation to obtain an acrylate of the bisphenol F-type epoxy resin. Thus obtained acrylate of the bisphenol F-type epoxy resin of 80 parts by weight, the Epoxy resin A of the Synthesis Example of 20 parts by weight, 3,6-bis(2-methyl-2-morphorinopropionyl)-9-n-octyl carbazole (Adeka Optmer N-1414, manufactured by Asahi Denka Kogyo Co., Ltd.) of 1.8 parts by weight, serving as a radical-forming photopolymerization initiator and an amino silane coupling agent (N-β(aminoethyl)-γ-aminopropyltrimethoxy silane, KBM-603, manufactured by Shin-Etsu Silicone Co., Ltd.) of 1.2 parts by weight were heated and dissolved at 90° C. to obtain a resin solution. Thus obtained resin solution was cooled to room temperature, then added with 4.1 parts by weight of isophthalic acid dihydrazide (trade name: IDH-S; prepared by finely grinding a material of jet-mill ground-grade manufactured by Otsuka Chemical Co., Ltd. using a jet mill; melting point: 224° C.; active hydrogen equivalent: 48.5 g/eq; average particle diameter: 1.7 μm; maximum particle diameter: 7 μm), 30 parts by weight of fused ground silica (Crystalite 1FF, manufactured by Tatsumori Co., Ltd., average particle diameter: 1.0 μm) and 1 part by weight of IXE-100 (a zirconium phosphate-series ion scavenger, manufactured by Toa Gosei Co., Ltd.), and kneaded using a three-roll mill to obtain a sealant for liquid crystals of the present invention. The sealant had viscosity of 300 Pa·s (25° C.) (measured by an R-type viscometer, manufactured by Toki Sangyo Co., Ltd.).

Example 2

A bisphenol F-type epoxy resin (RE-404P, manufactured by Nippon Kayaku Co., Ltd., epoxy equivalent: 160 g/eq, hydrolyzed amount: 30 ppm) was reacted with acrylic acid of amount of 100% equivalent to epoxy groups, subjected to purification by liquid-separation treatment using ion exchanged water/toluene and then deprived of toluene by evaporation to obtain an acrylate of the bisphenol F-type epoxy resin. Thus obtained acrylate of the bisphenol F-type epoxy resin of 80 parts by weight, the Epoxy resin B of the Synthesis Example of 20 parts by weight, 3,6-bis(2-methyl-2-morphorinopropionyl)-9-n-octyl carbazole (Adeka Optmer N-1414, manufactured by Asahi Denka Kogyo Co., Ltd.) of 1.8 parts by weight, serving as a radical-forming photopolymerization initiator and an amino silane coupling agent (N-β(aminoethyl)-γ-aminopropyltrimethoxy silane, KBM-603, manufactured by Shin-Etsu Silicone Co., Ltd.) of 1.2 parts by weight were heated and dissolved at 90° C. to obtain a resin solution. Thus obtained resin solution was cooled to room temperature, then added with 3.3 parts by weight of isophthalic acid dihydrazide (trade name: IDH-S; prepared by finely grinding a material of jet-mill ground-grade manufactured by Otsuka Chemical Co., Ltd. using a jet mill; melting point: 224° C.; active hydrogen equivalent: 48.5 g/eq; average particle diameter: 1.7 μm; maximum particle diameter: 7 μm), 30 parts by weight of fused ground silica (Crystalite 1FF, manufactured by Tatsumori Co., Ltd., average particle diameter: 1.0 μm) and 1 part by weight of IXE-100 (a zirconium phosphate-series ion scavenger, manufactured by Toa Gosei Co., Ltd.), and kneaded using a three-roll mill to obtain a sealant for liquid crystals of the present invention. The sealant had viscosity of 400 Pa·s (25° C.) (measured by an R-type viscometer, manufactured by Toki Sangyo Co., Ltd.).

Example 3

A bisphenol F-type epoxy resin (RE-404P, manufactured by Nippon Kayaku Co., Ltd., epoxy equivalent: 160 g/eq, hydrolyzed amount: 30 ppm) was reacted with acrylic acid of amount of 100% equivalent to epoxy groups, subjected to purification by liquid-separation treatment using ion exchanged water/toluene and then deprived of toluene by evaporation to obtain an acrylate of the bisphenol F-type epoxy resin. Thus obtained acrylate of the bisphenol F-type epoxy resin of 80 parts by weight, the Epoxy resin A of the Synthesis Example of 20 parts by weight, 3,6-bis(2-methyl-2-morphorinopropionyl)-9-n-octyl carbazole (Adeka Optmer N-1414, manufactured by Asahi Denka Kogyo Co., Ltd.) of 1.8 parts by weight, serving as a radical-forming photopolymerization initiator and an amino silane coupling agent (N-β(aminoethyl)-γ-aminopropyltrimethoxy silane, KBM-603, manufactured by Shin-Etsu Silicone Co., Ltd.) of 1.2 parts by weight were heated and dissolved at 90° C. to obtain a resin solution. Thus obtained resin solution was cooled to room temperature, then added with 3.8 parts by weight of adipic acid dihydrazide (trade name: ADH-S; prepared by finely grinding a material of jet-mill ground-grade manufactured by Otsuka Chemical Co., Ltd. using a jet mill; melting point: 181° C.; active hydrogen equivalent: 43.5 g/eq; average particle diameter: 1.3 μm; maximum particle diameter: 5 μm), 30 parts by weight of fused ground silica (Crystalite 1FF, manufactured by Tatsumori Co., Ltd., average particle diameter: 1.0 μm) and 1 part by weight of IXE-100 (a zirconium phosphate-series ion scavenger, manufactured by Toa Gosei Co., Ltd.), and kneaded using a three-roll mill to obtain a sealant for liquid crystals of the present invention. The sealant had viscosity of 300 Pa·s (25° C.) (measured by an R-type viscometer, manufactured by Toki Sangyo Co., Ltd.).

Example 4

A bisphenol F-type epoxy resin (RE-404P, manufactured by Nippon Kayaku Co., Ltd., epoxy equivalent: 160 g/eq, hydrolyzed amount: 30 ppm) was reacted with acrylic acid of amount of 100% equivalent to epoxy groups, subjected to purification by liquid-separation treatment using ion exchanged water/toluene and then deprived of toluene by evaporation to obtain an acrylate of the bisphenol F-type epoxy resin. Thus obtained acrylate of the bisphenol F-type epoxy resin of 80 parts by weight, the Epoxy resin D (EBPS-300, manufactured by Nippon Kayaku Co., Ltd.) used in the Experiment Example of 20 parts by weight, 3,6-bis(2-methyl-2-morphorinopropionyl)-9-n-octyl carbazole (Adeka Optmer N-1414, manufactured by Asahi Denka Kogyo Co., Ltd.) of 1.8 parts by weight, serving as a radical-forming photopolymerization initiator and an amino silane coupling agent (N-β(aminoethyl)-γ-aminopropyltrimethoxy silane, KBM-603, manufactured by Shin-Etsu Silicone Co., Ltd.) of 1.2 parts by weight were heated and dissolved at 90° C. to obtain a resin solution. Thus obtained resin solution was cooled to room temperature, then added with 4.2 parts by weight of isophthalic acid dihydrazide (trade name: IDH-S; prepared by finely grinding a material of jet-mill ground-grade manufactured by Otsuka Chemical Co., Ltd. using a jet mill; melting point: 224° C.; active hydrogen equivalent: 48.5 g/eq; average particle diameter: 1.7 μm; maximum particle diameter: 7 μm), 30 parts by weight of fused ground silica (Crystalite 1FF, manufactured by Tatsumori Co., Ltd., average particle diameter: 1.0 μm) and 1 part by weight of IXE-100 (a zirconium phosphate-series ion scavenger, manufactured by Toa Gosei Co., Ltd.), and kneaded using a three-roll mill to obtain a sealant for liquid crystals of the present invention. The sealant had viscosity of 480 Pa·s (25° C.) (measured by an R-type viscometer, manufactured by Toki Sangyo Co., Ltd.).

Comparative Example 1

A bisphenol F-type epoxy resin (RE-404P, manufactured by Nippon Kayaku Co., Ltd., epoxy equivalent: 160 g/eq, hydrolyzed amount: 30 ppm) was reacted with acrylic acid of amount of 100% equivalent to epoxy groups, subjected to purification by liquid-separation treatment using ion exchanged water/toluene and then deprived of toluene by evaporation to obtain an acrylate of the bisphenol F-type epoxy resin. Thus obtained acrylate of the bisphenol F-type epoxy resin of 80 parts by weight, the Epoxy resin C (RE-310P, manufactured by Nippon Kayaku Co., Ltd.) of the Experiment Example of 20 parts by weight, 3,6-bis(2-methyl-2-morphorinopropionyl)-9-n-octyl carbazole (Adeka Optmer N-1414, manufactured by Asahi Denka Kogyo Co., Ltd.) of 1.8 parts by weight, serving as a radical-forming photopolymerization initiator and an amino silane coupling agent (N-β(aminoethyl)-γ-aminopropyltrimethoxy silane, KBM-603, manufactured by Shin-Etsu Silicone Co., Ltd.) of 1.2 parts by weight were heated and dissolved at 90° C. to obtain a resin solution. Thus obtained resin solution was cooled to room temperature, then added with 5.7 parts by weight of isophthalic acid dihydrazide (trade name: IDH-S; prepared by finely grinding a material of jet-mill ground-grade manufactured by Otsuka Chemical Co., Ltd. using a jet mill; melting point: 224° C.; active hydrogen equivalent: 48.5 g/eq; average particle diameter: 1.7 μm; maximum particle diameter: 7 μm), 30 parts by weight of fused ground silica (Crystalite 1FF, manufactured by Tatsumori Co., Ltd., average particle diameter: 1.0 μm) and 1 part by weight of IXE-100 (a zirconium phosphate-series ion scavenger, manufactured by Toa Gosei Co., Ltd.), and kneaded using a three-roll mill to obtain a sealant for liquid crystals of the present invention. The sealant had viscosity of 200 Pa·s (25° C.) (measured by an R-type viscometer, manufactured by Toki Sangyo Co., Ltd.).

Experiment Example 2

Sealants for liquid crystals obtained in Examples 1 and 2 and Comparative Examples 1 and 2 were then subjected to an elution test to a liquid crystal, an adhesive strength test and a pot life test. Glass transition temperatures were also measured. The results are shown in Table 2.

TABLE 2

| | Ex. 1 | Ex. 2 | Ex. 3 | Ex. 4 | Comparative Ex. 1 |
|---|---|---|---|---|---|
| Viscosity (Pa · s) | 300 | 400 | 300 | 480 | 200 |
| Adhesive strength (MPa) | 75 | 75 | 80 | 75 | 75 |
| Pot life (Viscosity increase: %) | 20 | 20 | 10 | 20 | 20 |
| Glass transition temp. of cured product (° C.) | 87 | 87 | 90 | 89 | 87 |
| Liquid crystal contamination test (120° C. × 1 hr.) Elution amount (ppm) | | | | | |
| Epoxy resin A | 50 | — | 50 | — | — |
| Epoxy resin B | — | 200 | — | — | — |
| Epoxy resin C | — | — | — | — | 6000 |
| Epoxy resin D | — | — | — | 250 | — |
| Bisphenol F epoxy diacrylate | 450 | 450 | 430 | 450 | 450 |
| Isophthalic acid dihydrazide | ND | ND | — | ND | ND (IDH) |
| Adipic acid dihydrazide (ADH) | — | — | ND | — | — |
| Total | 500 | 650 | 480 | 700 | 6450 |

(ND: Not Detected)

As apparent from Table 2, in comparison between sealants for liquid crystals of the present invention to be used in a liquid-crystal dropping technique which are shown in Examples 1 and 2 and the sealant for liquid crystals using a bisphenol A-type epoxy resin to be used in a liquid-crystal dropping technique which is shown in Comparative Example 2, both sealants have almost the same values of adhesive strength, pot life and glass transition temperature. However, the elution amount to a liquid crystal of the sealant for liquid crystals of Comparative Example 1 is 6450 ppm, while those of the sealants for liquid crystals of Examples 1 and 2 are 500 ppm and 650 ppm, respectively, which are much reduced. In comparison between a sealant for liquid crystals of the present invention to be used in a liquid-crystal dropping technique which is shown in Example 1 and the sealant for liquid crystals to be used in a liquid-crystal dropping technique which is shown in Example 4, it can be understood that the elution amounts to a liquid crystal of both sealants are small due to both having bisphenol S skeletons, while the elution amount to a liquid crystal of the sealant of Example 1, which has ethylene oxide-added structure, is smaller than that of the sealant of Example 4.

In other words, it can be understood that a sealant for liquid crystals of the present invention to be used in a liquid-crystal dropping technique gives much reduced elution amount to a liquid crystal while keeping characteristics thereof as a sealant.

Each test was carried out according to the following methods.

An Adhesive Strength Test

The resulting sealant for liquid crystals of 100 g was added with 1 g of 5 μm glass fiber and mixed under stirring. The resulting sealant for liquid crystals was applied onto a glass substrate of 50 mm×50 mm, and a glass plate of 1.5 mm×1.5 mm was bonded onto the sealant for liquid crystals, and after irradiation with ultraviolet rays of 3000 mJ/cm$^2$ by an UV irradiation device, the sample was put into an oven and held therein at 120° C. for one hour so as to be cured. Shear adhesive strength of the glass plate was measured.

A Pot Life Test

The resulting sealant for liquid crystals was allowed to stand still at 30° C., and increasing rate (%) in viscosity relative to the initial viscosity was measured.

Glass Transition Temperature

A thin film having thickness of 60 μm was prepared by sandwiching the resulting sealant for liquid crystals with polyethylene terephthalate (PET) films, and after irradiation with ultraviolet rays of 3000 mJ/cm² by an UV irradiation device, the film was put into an oven and held therein at 120° C. for one hour so as to be cured. After the curing process, the PET films were peeled off to form a sample. Glass transition temperature of the sample was measured in a tensile mode using a thermo-mechanical analyzer TMA (manufactured by ULVAC-RIKO, Inc.).

An Elution Test to Liquid Crystal

Components constituting a sealant that eluted to a liquid crystal, when the sealant before curing was in contact with the liquid crystal, were determined by gas chromatography. A sealant for liquid crystals of 0.1 g was added in a sample bottle, added with 1 ml of a liquid crystal (MLC-6866-100, manufactured by Merck Ltd.) and then subjected to contact treatment at 120° C. for one hour in an oven assuming curing conditions of the sealant. The conditions of the contact treatment were set to be at 120° C. for one hour without UV curing assuming a light-shield portion in a liquid-crystal dropping technique using a photo-thermo curing method. After left for standing at room temperature for one hour, the liquid crystal subjected to the contact treatment was moved into an empty bottle. The components constituting the sealant that eluted to the liquid crystal was determined by gas chromatography using pentadecane as an internal standard substance to obtain the elution amount.

Synthesis Example B

Synthesis of a Bisphenol S Glycidyl-Etherified Compound

A mixture of 1250 g of bisphenol S, 2654 g of epichlorohydrin, 436 g of methanol and 125 g of water was heated to 60° C. and dissolved while being stirred under a nitrogen atmosphere. Then, 445 g of sodium hydroxide flakes was added thereto in small portions in 100 minutes, and this solution was further subjected to a post reaction at 65° C. for three hours. Upon completion of the reaction, the reaction product was washed with 2400 g of hot water at 70° C. Excess epichlorohydrin, and the like were then evaporated off from the oil layer at 130° C. under reduced pressure. Methyl isobutyl ketone of 2900 g and water of 133 g were added to the residue so as to be dissolved, and this solution was heated to 70° C. A 30% sodium hydroxide aqueous solution of 133 g was added thereto while the mixture was being stirred, and this was allowed to react for one hour. After the reaction product was washed with 3600 g of water three times, the methyl isobutyl ketone was evaporated off at 180° C. under reduced pressure to obtain 1810 g a bisphenol S glycidyl-etherified compound. The resulting epoxy resin had epoxy equivalent of 181 g/eq.

Experiment Example B1

An Elution Test to Liquid Crystal

Components constituting a sealant eluted to a liquid crystal, when the epoxy resin synthesized by the above method was in contact with the liquid crystal, were determined by gas chromatography. In more detail, a bisphenol S-type epoxy resin of 0.1 g was charged in a sample bottle, added with 1 ml of a liquid crystal (MLC-6866-100, manufactured by Merck Ltd.) and further subjected to contact treatment at 120° C. for one hour in an oven assuming curing conditions of the sealant. After left for standing at room temperature for one hour, the liquid crystal subjected to the contact treatment was moved into an empty bottle. The epoxy resin that eluted to the liquid crystal was determined by gas chromatography using pentadecane as an internal standard substance to obtain the elution amount (% by weight). A bispnenol A-type liquid-state epoxy resin was used in Comparative Example (Comparative Example B1). The results are shown in Table B1.

TABLE B1

|  | Synthesis Example | Comparative Example 1 |
|---|---|---|
| Elution amount (wt %) | 0.6 | 9.2 |

As apparent from Table B1, the elution amount of the bisphenol A-type epoxy resin of Comparative Example 1 reaches 9.2% by weight. In contrast, the elution amount to a liquid crystal of the bisphenol S-type epoxy resin to be used in the present invention is only 0.6% by weight, which is much reduced to about 1/15 times that of the bisphenol A-type epoxy resin. It is apparent that a bisphenol S-type epoxy resin elutes much less to a liquid crystal component, compared with a bisphenol A-type epoxy resin.

Example B1

A bisphenol F-type epoxy resin (RE-404P, manufactured by Nippon Kayaku Co., Ltd., epoxy equivalent: 160 g/eq, hydrolyzed amount: 30 ppm) was reacted with acrylic acid of amount of 100% equivalent to epoxy groups, subjected to purification by liquid-separation treatment using ion exchanged water/toluene and then deprived of toluene by evaporation to obtain an acrylate of the bisphenol F-type epoxy resin. Thus obtained acrylate of the bisphenol F-type epoxy resin of 80 parts by weight, the bisphenol S-type epoxy resin of the Synthesis Example of 20 parts by weight, 3,6-bis (2-methyl-2-morphorinopropionyl)-9-n-octyl carbazole (Adeka Optmer N-1414, manufactured by Asahi Denka Kogyo Co., Ltd.) of 1.8 parts by weight, serving as a radical-forming photopolymerization initiator and an amino silane coupling agent (N-β(aminoethyl)-γ-aminopropyltrimethoxy silane, KBM-603, manufactured by Shin-Etsu Silicone Co., Ltd.) of 1.2 parts by weight were heated and dissolved at 90° C. to obtain a resin solution. Thus obtained resin solution was cooled to room temperature, then added with 5.4 parts by weight of isophthalic acid dihydrazide (trade name: IDH-S; prepared by finely grinding a material of jet-mill ground-grade manufactured by Otsuka Chemical Co., Ltd. using a jet mill; melting point: 224° C.; active hydrogen equivalent: 48.5 g/eq; average particle diameter: 1.7 μm; maximum particle diameter: 7 μm) and 30 parts by weight of fused ground silica (Crystalite 1FF, manufactured by Tatsumori Co., Ltd., average particle diameter: 1.0 μm), and kneaded using a three-roll mill to obtain a sealant for liquid crystals. The sealant had viscosity of 480 Pa·s (25° C.) (measured by an R-type viscometer, manufactured by Toki Sangyo Co., Ltd.).

Example B2

A bisphenol F-type epoxy resin (RE-404P, manufactured by Nippon Kayaku Co., Ltd., epoxy equivalent: 160 g/eq, hydrolyzed amount: 30 ppm) was reacted with acrylic acid of amount of 100% equivalent to epoxy groups, subjected to purification by liquid-separation treatment using ion exchanged water/toluene and then deprived of toluene by evaporation to obtain an acrylate of the bisphenol F-type epoxy resin. Thus obtained acrylate of the bisphenol F-type epoxy resin of 80 parts by weight, a bisphenol A-type liquid-state epoxy resin (RE-310P, manufactured by Nippon Kayaku Co., Ltd., epoxy equivalent: 170 g/eq, amount of hydrolyzable chlorine: 120 ppm) of 20 parts by weight, 3,6-bis(2-methyl-2-morphorinopropionyl)-9-n-octyl carbazole (Adeka Optmer N-1414, manufactured by Asahi Denka Kogyo Co., Ltd.) of 1.8 parts by weight, serving as a radical-forming photopolymerization initiator and an amino silane coupling agent (N-β(aminoethyl)-γ-aminopropyltrimethoxy silane, KBM-603, manufactured by Shin-Etsu Silicone Co., Ltd.) of 1.2 parts by weight were heated and dissolved at 90° C. to obtain a resin solution. Thus obtained resin solution was cooled to room temperature, then added with 5.7 parts by weight of isophthalic acid dihydrazide (trade name: IDH-S; prepared by finely grinding a material of jet-mill ground-grade manufactured by Otsuka Chemical Co., Ltd. using a jet mill; melting point: 224° C.; active hydrogen equivalent: 48.5 g/eq; average particle diameter: 1.7 μm; maximum particle diameter: 7 μm) and 30 parts by weight of fused ground silica (Crystalite 1FF, manufactured by Tatsumori Co., Ltd., average particle diameter: 1.0 μm), and kneaded using a three-roll mill to obtain a sealant for liquid crystals. The sealant had a viscosity of 200 Pa·s (25° C.) (measured by an R-type viscometer, manufactured by Toki Sangyo Co., Ltd.).

Experiment Example B2

The sealants for liquid crystals obtained in Example 1 and Comparative Example 2 were subjected to an elution test to a liquid crystal, an adhesive strength test and a pot life test. Glass transition temperatures were also measured. The results are shown in Table B2.

TABLE B2

|  | Example B1 | Comparative Example B2 |
|---|---|---|
| Viscosity (Pa · s) | 480 | 200 |
| Adhesive strength (MPa) | 75 | 75 |
| Pot life (Viscosity increase: %) | 20 | 20 |
| Glass transition temperature(° C.) of cured product | 89 | 87 |
| Liquid crystal contamination test (120° C. × 1 hr.) Elution amount (ppm) | | |
| Bisphenol A-type epoxy resin | — | 6000 |
| Bisphenol S-type epoxy resin | 250 | — |
| Bisphenol F epoxy diacrylate | 450 | 450 |
| Isophthalic acid dihydrazide (IDH) | Not Detected | Not Detected |
| Total | 700 | 6450 |

As apparent from Table B2, in comparison between a sealant for liquid crystals of the present invention to be used in a liquid-crystal dropping technique which is shown in Example B1 and the sealant for liquid crystals using a known partially acrylated bisphenol A-type epoxy resin to be used in a liquid-crystal dropping technique which is shown in Comparative Example 2, both sealants have almost the same values of adhesive strength, pot life and glass transition temperature, however, the elution amount to a liquid crystal of the sealant for liquid crystals of Comparative Example 2 is 6450 ppm, while that of the sealant for liquid crystals of Example 1 is 700 ppm, which is much reduced.

In other words, it can be understood that a sealant for liquid crystals of the present invention to be used in a liquid-crystal dropping technique gives much reduced elution amount to a liquid crystal while keeping characteristics thereof as a sealant.

INDUSTRIAL APPLICABILITY

A liquid crystal display cell can now be manufactured in an improved yield and productivity by using, in a liquid crystal dropping technique, a sealant for liquid crystals of the present invention that exhibits excellent coatability, bondability and gap-forming ability when applied to a substrate and has long pot life, high adhesive strength and low contamination to a liquid crystal.

The invention claimed is:

1. A sealant for liquid crystals characterized by comprising an epoxy resin (a) represented by general formula (1):

(wherein a represents an integer of 2 to 4; n represents 1 to 1.5 (average value); R represents —$CH_2$—$CH_2$—; A represents a polyvalent aromatic group selected from a di- or trivalent phenol or naphthol residue; a di- to tetravalent aromatic group formed by bonding 2 to 4 benzene rings or naphthalene rings (aliphatic group(s) of 1 to 6 carbon atoms may be present as a substituent on the benzene ring or naphthalene ring, and the total number of bonding arms on the ring is 2 to 4) through single bond, divalent aliphatic hydrocarbon residue(s) (which may be substituted with a phenyl group) of 1 to 3 carbon atoms, oxygen atom(s) or a sulfur atom(s) (which may be in a sulfonyl form); or a residue obtained by removing a hydroxyl group from a novolac resin; and G represents a glycidyl group, (b) a thermo-curing agent, and (c) a filler having average particle diameter of not larger than 3 μm.

2. The sealant for liquid crystals according to claim 1, wherein the polyvalent aromatic group is a divalent aromatic group represented by the formula:

-ph-X-ph-

{wherein, ph represents a phenylene group (which may have an aliphatic group of 1 to 6 carbon atoms as a substituent); X represents a cross-linking group represented by —O—, —S—, —$S(O)_2$— or the formula:

(wherein $R_3$ and $R_4$ are bondned to form a fluorene ring of $C(R_3)(R_4)$)}.

3. The sealant for liquid crystals according to claim 1, wherein the epoxy resin (a) represented by general formula (1) is a bisphenol S-type; and n represents 1 to 1.5 (average value).

4. The sealant for liquid crystals according to claim 3, wherein the epoxy resin (a) is an epoxy resin represented by general formula (2):

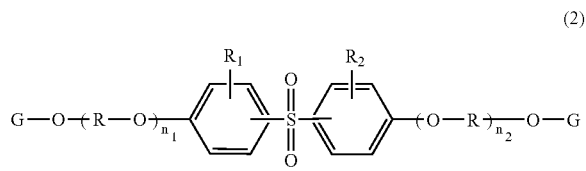

(wherein $n_1$ and $n_2$ represent each independently 1 to 1.5; R represents —CH$_2$—CH$_2$—; R$_1$ and R$_2$ represent each independently a hydrogen atom or a monovalent hydrocarbon group of 1 to 6 carbon atoms; and G represents a glycidyl group).

5. The sealant for liquid crystals according to claim 4, wherein the epoxy resin (a) is an epoxy resin represented by general formula (3):

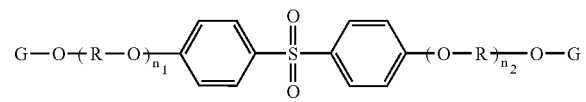

(3)

(wherein $n_1$ and $n_2$ represent each independently 1 to 1.5; R represents —CH$_2$—CH$_2$—; and G represents a glycidyl group).

6. The sealant for liquid crystals according to claim 1, wherein the epoxy resin (a) is an epoxy resin represented by general formula (4):

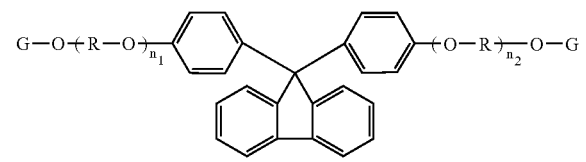

(4)

(wherein $n_1$ and $n_2$ represent each independently a positive number of 1 to 1.5; R represents —CH$_2$—CH$_2$—; and G represents a glycidyl group).

7. The sealant for liquid crystals according to claim 1, wherein the thermo-curing agent (b) is polyfunctional dihydrazides or a polyvalent phenol compound.

8. The sealant for liquid crystals according to claim 7, wherein the polyfunctional dihydrazides are isophthalic acid hydrazide, dihydrazides having valine hydantoin skeleton, or adipic acid dihydrazide.

9. The sealant for liquid crystals according to claim 1, wherein mixing ratio of the epoxy resin (a) and the thermo-curing agent (b) is 0.8 to 3 equivalent of the active hydrogen of the thermo-curing agent (b)based on 1 equivalent of the epoxy group of the epoxy resin (a); and the content of the filler (c) having average particle diameter of not larger than 3 μm in the sealant for liquid crystals is from 5 to 40% by weight.

10. The sealant for liquid crystals according to claim 1, further comprising, as a component, a curable resin (d) having a (meth)acrylic group and a radical-forming type photopolymerization initiator (e).

11. The sealant for liquid crystals according to claim 10, wherein the curing resin (d) having a (meth)acrylic group is a (meth)acrylate of an aromatic epoxy resin.

12. The sealant for liquid crystals according to claim 11, wherein the (meth)acrylate of an aromatic epoxy resin is a (meth)acrylate of a bisphenol-type epoxy resin.

13. The sealant for liquid crystals according to claim 10, wherein the curing resin (d) having a (meth)acrylic group is a (meth)acrylate of (a) an epoxy resin represented by the general formula (1).

14. The sealant for liquid crystals according to claim 10, wherein the radical-forming photopolymerization initiator (e) is a carbazole-series photopolymerization initiator or an acridine-series photopolymerization initiator.

15. The sealant for liquid crystals according to claim 10, further comprising a silane coupling agent (f).

16. The sealant for liquid crystals according to claim 15, further comprising an ion scavenger (g).

17. The sealant for liquid crystals according to claim 16, wherein the ion scavenger is at least one kind selected from a group consisting of a bismuth oxide-series ion scavenger, an antimony oxide-series ion scavenger, a titanium phosphate-series ion scavenger, a zirconium phosphate-series ion scavenger and a hydrotalcite-series ion scavenger.

18. The sealant for liquid crystals according to claim 16, wherein the contents in the sealant for liquid crystals fall in the ranges of 5 to 80% of the epoxy resin (a) component, 2 to 20% of the thermo-curing agent (b) component, 5 to 50% of the filler (c) component having average particle diameter of not larger than 3 μm, 5 to 80% of the curable resin (d) component having a (meth)acrylic group, 0.1 to 3% of the radical-forming photopolymerization initiator (e) component, 0.2 to 2% of the silane coupling agent (f) component and 0.2 to 20% of the ion scavenger (g) component.

19. A liquid crystal display cell sealed by a cured product of the sealant for liquid crystals according to claim 1.

20. A method for manufacturing a liquid crystal display cell characterized, in the liquid crystal display cell composed of two substrates, by dropping a liquid crystal inside a bank of the sealant for liquid crystals according to claim 1, that is formed on one substrate, thereafter bonding the other substrate thereto and then curing the sealant for liquid crystals.

21. A composition characterized by comprising (a) an epoxy resin represented by general formula (1):

(1)

(wherein a represents an integer of 2 to 4; n represents 1 to 1.5 (average value); R represents —CH$_2$—CH$_2$—; A represents a polyvalent aromatic group selected from a di- or trivalent phenol or naphthol residue; a di- to tetravalent aromatic group formed by bonding 2 to 4 benzene rings or naphthalene rings (aliphatic group(s) of 1 to 6 carbon atoms may be present as a substituent on the benzene ring or naphthalene ring, and the total number of bonding arms on the ring is 2 to 4) through single bond, divalent aliphatic hydrocarbon residue(s) (which may be substituted with a phenyl group) of 1 to 3 carbon atoms, oxygen atom(s) or a sulfur atom(s) (which may be in a sulfonyl form); or a residue obtained by removing a hydroxyl group from a novolac resin; and G represents a glycidyl group, (b) a thermo-curing agent, and (c) a filler having average particle diameter of not larger than 3 μm.

22. The composition according to claim 21, characterized by further comprising the curable resin (d) having a (meth) acryl group, the radical-forming photopolymerization initiator (e), the silane coupling agent (f) and the ion scavenger (g).

* * * * *